United States Patent [19]

Tollar et al.

[11] Patent Number: 5,586,450

[45] Date of Patent: Dec. 24, 1996

[54] PLURAL COMPRESSOR OIL LEVEL CONTROL

[75] Inventors: Paul S. Tollar, Liverpool; Russell E. Wood, Fayetteville, both of N.Y.

[73] Assignee: Carrier Corporation, Syracuse, N.Y.

[21] Appl. No.: 533,491

[22] Filed: Sep. 25, 1995

[51] Int. Cl.[6] .................................................. F25B 31/00
[52] U.S. Cl. .............................. 62/192; 62/468; 62/510
[58] Field of Search ............................... 62/84, 192, 193, 62/335, 468, 470, 469, 510

[56] References Cited

U.S. PATENT DOCUMENTS 2,140,415  12/1938  Buehler, Jr. ................................ 62/193
3,719,057   6/1973  Grant ........................................... 62/193

Primary Examiner—John M. Sollecito

[57] ABSTRACT

Each compressor in a circuit has an oil pump with excess capacity relative to lubrication requirements of the respective compressor. Excess capacity is diverted to a common line which connects to each of the compressors in the circuit through a float valve. Each float valve is operated responsive to the oil level in the associated compressor such that oil diverted as excess capacity is supplied to any compressor in the circuit short of oil.

3 Claims, 2 Drawing Sheets

PLURAL COMPRESSOR OIL LEVEL CONTROL

BACKGROUND OF THE INVENTION

When multiple compressors are installed in the same refrigerant circuit, they are manifolded together and it becomes necessary to maintain the oil level in each compressor. There are two commonly employed arrangements for maintaining equal oil levels. First, an oil separator is used to collect oil expelled from the compressor(s) with the oil being collected in a reservoir and fed back to the compressor(s) via float valves which maintain compressor oil levels. The major disadvantages of this arrangement are that it is expensive and bulky. Second, isolate the sump of each compressor with a check valve in the end of the crankshaft and interconnect the compressors with a large tube at a sight glass port to allow oil flow between compressors. The major disadvantage of this arrangement is the need for a sealed compressor sump. With compressors using the new HFC refrigerants and polyol ester (POE) oils, a vent is desired between the sump and the suction thereby allowing pressure differences between the sumps of the compressors in the circuit. However, this can permit pulling oil out of idle compressors.

SUMMARY OF THE INVENTION

A high capacity pump such as that disclosed in commonly assigned U.S. patent application 157,544 filed Nov. 26, 1993 and now U.S. Pat. No. 5,476,370 is designed to handle two-phase flow and thereby has the capacity to pump excess oil which is bypassed. The present invention uses oil level regulators, float valves, to control the oil level in the compressors but provides oil flow to the float valves by virtue of the excess oil from the compressor oil pump. Conventional oil pumps do not have the excess flow capacity necessary to use this concept. The oil supply to the float valves is manifolded and interconnected at the oil pressure test port through a check valve in order to prevent reverse flow if one or more compressors is idle. The manifold is connected to an oil float valve on each compressor. Thus, any compressor short of oil will be supplied with more oil from any operating compressor on the same circuit. A pressure drop must be provided in the oil supply to prevent excessive reduction in the compressor oil pressure by either controlling the orifice size in the float valve or by sizing a pressure drop in the supply tubing.

It is an object of this invention to maintain equal oil levels in vented compressors.

It is another object of this invention to maintain oil level in manifolded semi-hermetic and open drive compressors. These objects, and others as will become apparent hereinafter, are accomplished by the present invention.

Basically, the oil pump of each manifolded compressor has excess capacity. At least a portion of the excess capacity is supplied via an oil level regulator, such as a float valve, to oil sumps requiring additional oil.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
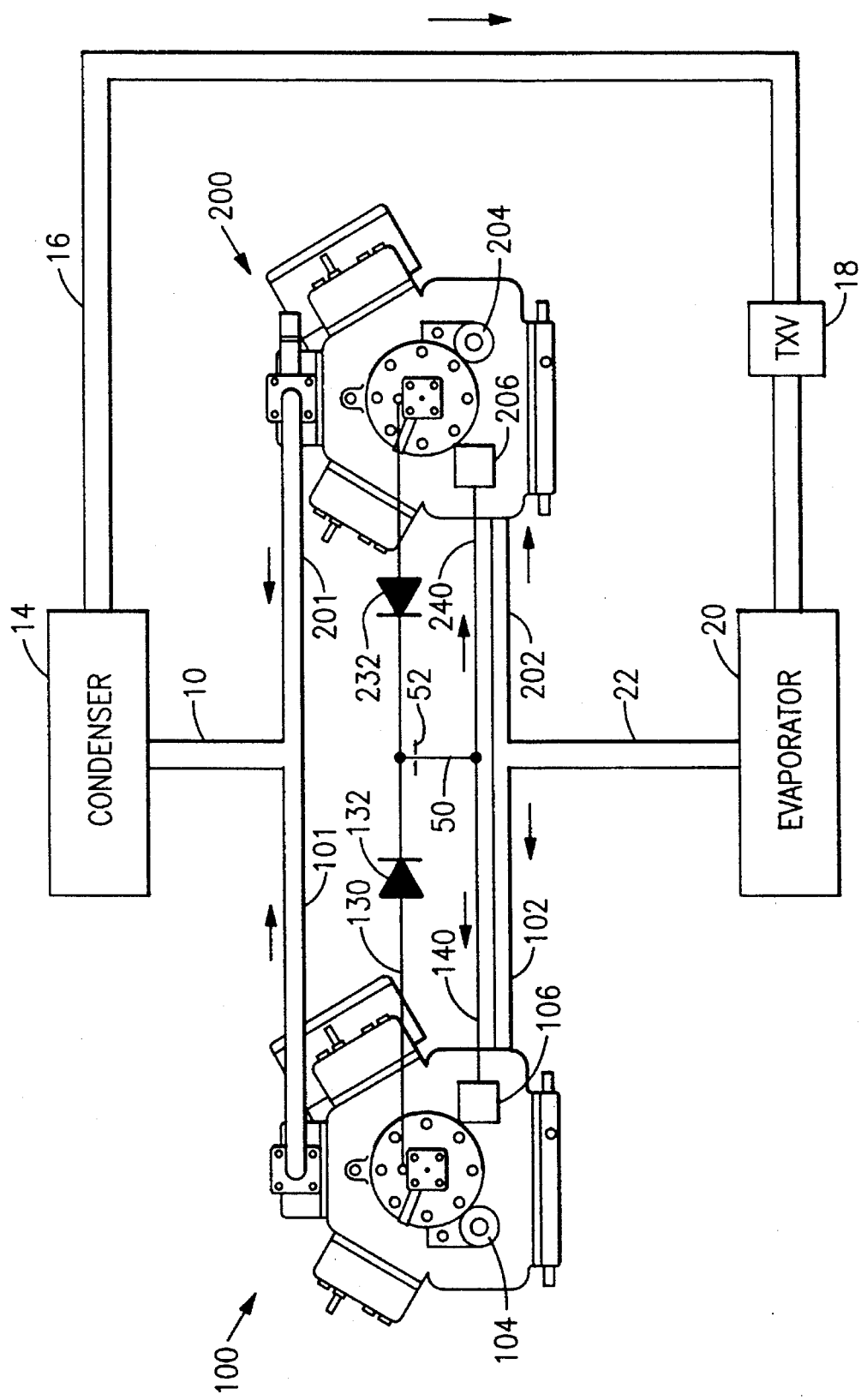
FIG. 1 is a view of a refrigeration system containing two compressors multiplexed according to the teachings of the present invention.
Figure 2:
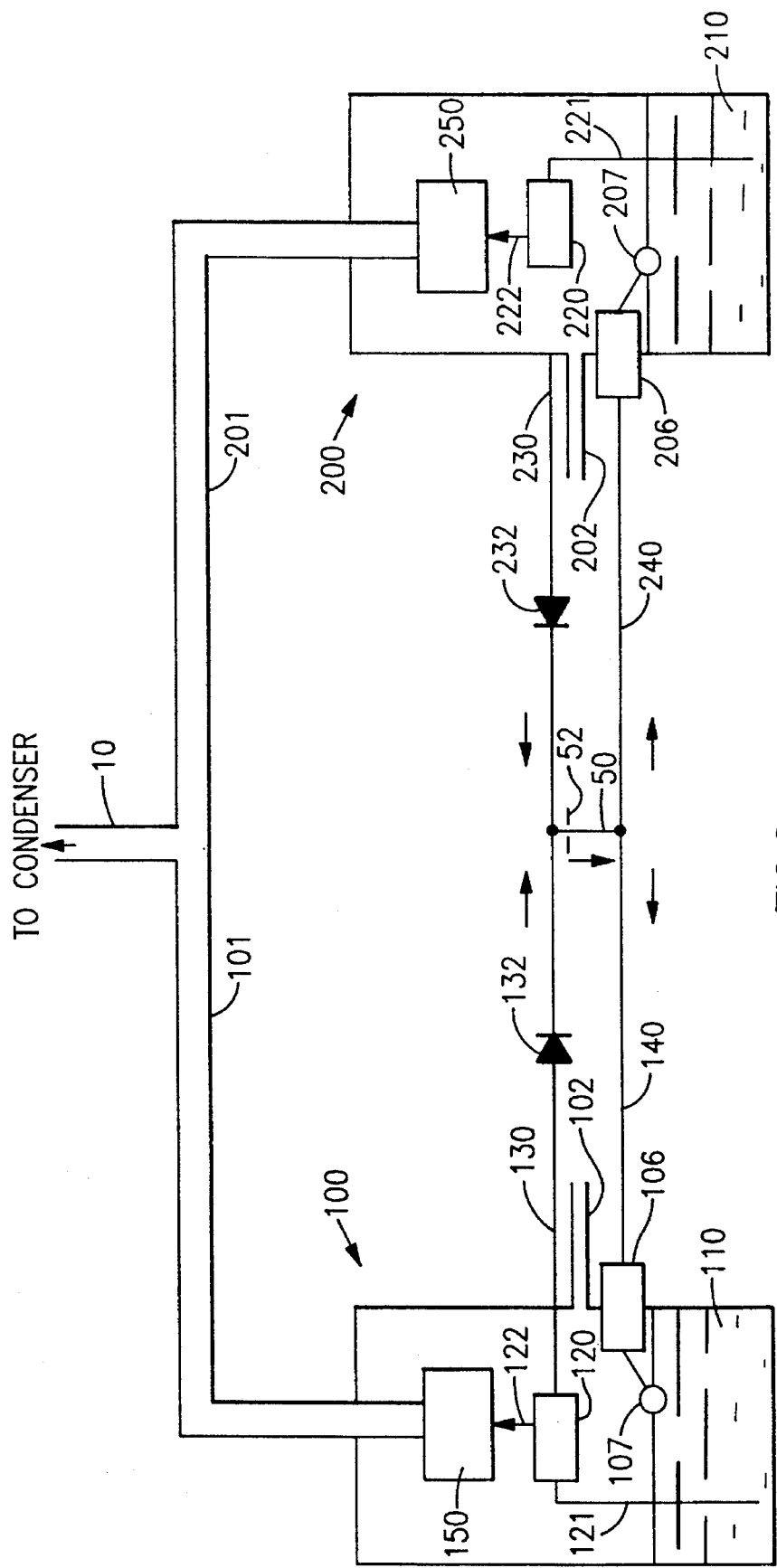
FIG. 2 is a schematic representation of the oil level control in the compressors of FIG. 1.

In FIGS. 1 and 2, the numerals 100 and 200 designate positive displacement, semi-hermetic compressors. Compressors 100 and 200 may be of the same or different capacity and are representative of the plurality of compressors that are in the same circuit. Compressors 100 and 200 have discharge lines 101 and 201, respectively, which combine to form line 10 which supplies hot, pressurized refrigerant gas from compressors 100 and 200 to condenser 14. In condenser 14, the hot refrigerant gas gives up heat to the condenser air thereby cooling the compressed gas and changing the state of the refrigerant form a gas to a liquid. Liquid refrigerant flows from the condenser 14 via liquid line 16 to expansion device 18, which may be a thermostatic expansion valve (TXV). As the liquid refrigerant passes through the orifice of the expansion device 18, some of the liquid refrigerant vaporizes into a gas (flash gas). The mixture of liquid and gaseous refrigerant passes to the evaporator 20. Heat is absorbed by the refrigerant from the evaporator air by the balance of the liquid refrigerant causing it to vaporize in the coil of the evaporator 20. The vaporized refrigerant then flows via common suction line 22 which divides into suction lines 102 and 202 leading to compressors 100 and 200, respectively, to complete the fluid circuit. Compressors 100 and 200 would normally have two ports containing sight glasses but only sight glasses 104 and 204, respectively, are present. Float valves 106 and 206 having floats 107 and 207, respectively, are located in the ports normally containing the second sight glass. Floats 107 and 207 control float valves 106 and 206 responsive to the oil level of oil 110 in compressor 100 and oil 210 in compressor 200, respectively.

Compressors 100 and 200 are lubricated by oil supplied by oil pumps 120 and 220, respectively. Pumps 120 and 220 are integral with and driven by the crankshafts (not illustrated) of compressor 120 and 220. Oil pump 120, responsive to the rotation of the crankshaft, draws oil 110 via oil pickup tube 121, and pressurizes the oil delivers it to the running gear 150. Because oil pump 120 pumps more oil than is necessary for lubrication of compressor 100, a portion of the oil is supplied via line 122 for lubricating compressor 100 and a portion is bypassed externally of compressor 100 via line 130 which is connected to the oil pressure test port of compressor 100 and which contains check valve 132. Similarly, oil pump 220 draws oil 210 via oil pickup tube 221 and pumps a portion to line 222 for lubricating the running gear 250 of compressor 200 and bypasses a portion externally of compressor 200 via line 230 which is connected to the oil pressure test port of compressor 200 and which contains check valve 232. Lines 130 and 230, as well as the corresponding lines of commonly manifolded compressors, (not illustrated) combine downstream of check valves 132 and 232 to form common line 50. Common line 50 contains metering orifice 52 to limit bypass flow such that sharp pressure drops in the lubrication delivery paths are avoided. Line 50 branches to feed each of the compressors. Specifically, as illustrated, line 50 divides into line 140 which feeds oil into compressor 100 under the control of valve 106 and into line 240 which feeds oil into compressor 200 under the control of valve 206. Valves 106 and 206 are controlled by floats 107 and 207 responsive to the level of oil 110 in compressor 100 and the level of oil 210 in compressor 200, respectively. If desired, metering orifice 52 can be replaced with, or supplemented with, metering orifices, or the like, in lines 140 and 240 as well as corresponding lines. This arrangement couples the metering structure with individual compressors.

In operation, each operating compressor in the same circuit will bypass excess capacity oil to common line 50 via a corresponding supply line containing a check valve such as via line 130 and check valve 132 for compressor 100. Common line 50 connects with a float valve on each compressor such as via line 140 and float valve 106 for compressor 100 and via line 240 and float valve 206 for compressor 200. The float valves open responsive to a reduced oil level in the compressor sensed by the corresponding float such as float 107 for float valve 106 of compressor 100 and float 207 for float valve 206 of compressor 200. Accordingly, any compressor short of oil will be supplied with more oil from any operating compressor on the same circuit, independent of whether or not the compressor needing oil is operating.

Although a preferred embodiment of the present invention has been described and illustrated, other changes will occur to those skilled in the art. It is therefore intended that the scope of the present invention is to be limited only by the scope of the appended claims.

What is claimed is:

1. A refrigeration circuit containing condensing means, expansion means and evaporator means, a plurality of compressors having a common discharge for supplying hot compressed refrigerant to said condensing means and a common return for returning refrigerant to said compressors:

each of said plurality of compressors having a discharge line connected to said common discharge, suction line connected to said common return, an oil supply in the compressor having an oil level, an oil pump connected to the oil supply and having an excess capacity, lubrication delivering means for delivering oil from the oil pump to the compressor for lubrication and means for bypassing excess oil from the oil pump out of the compressor, oil return means including means for controlling the oil return means responsive to the oil level;

each of said means for bypassing excess oil including bypass oil delivery means connected to a common line;

said common line branching into a plurality of oil return lines respectively connecting with each of said plurality of compressors through the respective oil return means whereby bypassed excess oil is returned to each of said plurality of compressors responsive to the respective oil level in each compressor.

2. The circuit of claim 1 further including reverse flow prevention means in each of said bypass oil delivery means.

3. The circuit of claim 1 further including means for limiting return flow to each of said plurality of compressors.

* * * * *